United States Patent
Kamiya

(10) Patent No.: US 11,434,787 B2
(45) Date of Patent: Sep. 6, 2022

(54) VALVE TIMING ADJUSTMENT DEVICE

(71) Applicant: DENSO CORPORATION, Kariya (JP)

(72) Inventor: Takahito Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/475,591

(22) Filed: Sep. 15, 2021

(65) Prior Publication Data

US 2022/0003134 A1  Jan. 6, 2022

Related U.S. Application Data

(63) Continuation of application No. PCT/JP2020/011394, filed on Mar. 16, 2020.

(30) Foreign Application Priority Data

Mar. 18, 2019 (JP) .............................. JP2019-049314

(51) Int. Cl.
*F01L 1/352* (2006.01)
*F01L 13/00* (2006.01)

(52) U.S. Cl.
CPC ......... *F01L 1/352* (2013.01); *F01L 2013/103* (2013.01)

(58) Field of Classification Search
CPC ............................ F01L 1/352; F01L 2013/103

USPC ........................................................ 123/90.17
See application file for complete search history.

(56) References Cited

U.S. PATENT DOCUMENTS

| 2011/0030632 | A1* | 2/2011 | David | F01L 1/344 |
| | | | | 123/90.17 |
| 2011/0265747 | A1 | 11/2011 | Tadokoro et al. | |
| 2014/0014052 | A1 | 1/2014 | Tadokoro et al. | |
| 2015/0322826 | A1 | 11/2015 | Yamanaka et al. | |
| 2016/0348603 | A1* | 12/2016 | Mikawa | F02D 41/009 |
| 2018/0135469 | A1* | 5/2018 | Manako | F01L 1/352 |

FOREIGN PATENT DOCUMENTS

| JP | 2012-82691 | 4/2012 |
| JP | 2018-123727 | 8/2018 |

* cited by examiner

*Primary Examiner* — Jorge L Leon, Jr.
(74) *Attorney, Agent, or Firm* — Nixon & Vanderhye P.O.

(57) ABSTRACT

A valve timing adjustment device includes a driving-side rotatable body and a driven-side rotatable body. The driving-side rotatable body is configured to be rotated about a rotational axis synchronously with a drive shaft and includes a sprocket portion and a housing portion. The sprocket portion is configured to receive a drive force transmitted from the drive shaft. The housing portion is shaped in a tubular form and is formed separately from the sprocket portion. The driven-side rotatable body is configured to be rotated about the rotational axis synchronously with a driven shaft.

4 Claims, 5 Drawing Sheets

VALVE TIMING ADJUSTMENT DEVICE

CROSS REFERENCE TO RELATED APPLICATIONS

This application is a continuation application of International Patent Application No. PCT/JP2020/011394 filed on Mar. 16, 2020, which designated the U.S. and claims the benefit of priority from Japanese Patent Application No. 2019-49314 filed on Mar. 18, 2019. The entire disclosures of all of the above applications are incorporated herein by reference.

TECHNICAL FIELD

The present disclosure relates to a valve timing adjustment device.

BACKGROUND

Previously, there is known an electrical valve timing adjustment device which adjusts a valve timing of intake valves or exhaust valves of an internal combustion engine. For example, one previously proposed valve timing adjustment device includes a speed reducing mechanism that has a plurality of rollers. The rollers are installed between an eccentric shaft portion, which receives a rotational force transmitted from an electric actuator, and a plurality of internal teeth formed at a driving-side rotatable body. The rotational force is outputted from a retainer that limits movement of the rollers in a circumferential direction.

In this valve timing adjustment device, the internal teeth are formed at an inner peripheral surface of the driving-side rotatable body, and a sprocket portion, which receives the drive force transmitted from a drive shaft, is formed at an outer peripheral surface of the driving-side rotatable body. Here, the sprocket portion may be formed such that a shape and a size of the sprocket portion and the number of teeth of the sprocket portion vary according to a specification of the internal combustion engine.

SUMMARY

This section provides a general summary of the disclosure, and is not a comprehensive disclosure of its full scope or all of its features.

According to the present disclosure, there is provided a valve timing adjustment device to be installed to an end part of a driven shaft in an axial direction while the driven shaft is configured to receive a drive force transmitted from a drive shaft at an internal combustion engine. The valve timing adjustment device is configured to adjust a valve timing of a valve that is driven to open and close by the driven shaft. The valve timing adjustment device includes a driving-side rotatable body and a driven-side rotatable body. The driving-side rotatable body is configured to be rotated about a rotational axis synchronously with the drive shaft and includes a sprocket portion and a housing portion. The sprocket portion is configured to receive the drive force transmitted from the drive shaft. The housing portion is shaped in a tubular form and is formed separately from the sprocket portion. The driven-side rotatable body is configured to be rotated about the rotational axis synchronously with the driven shaft.

According to the present disclosure, there is also provided a manufacturing method of the valve timing adjustment device. The manufacturing method includes forming the sprocket portion and the housing portion separately.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
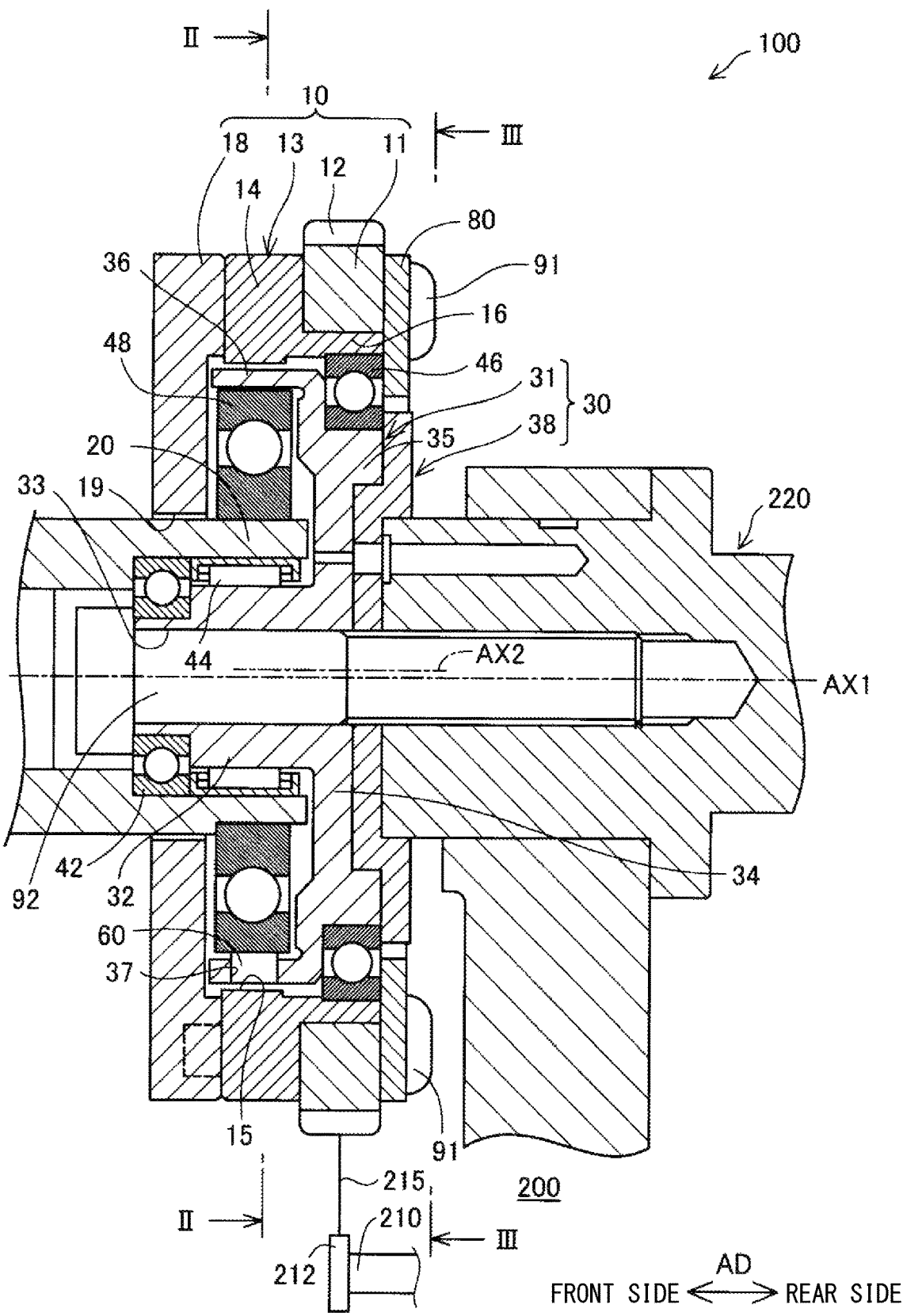
FIG. 1 is a cross-sectional view showing a schematic structure of a valve timing adjustment device according to a first embodiment.

Previously, there is known an electrical valve timing adjustment device which adjusts a valve timing of intake valves or exhaust valves of an internal combustion engine. For example, one previously proposed valve timing adjustment device includes a speed reducing mechanism that has a plurality of rollers. The rollers are installed between an eccentric shaft portion, which receives a rotational force transmitted from an electric actuator, and a plurality of internal teeth formed at a driving-side rotatable body. The rotational force is outputted from a retainer that limits movement of the rollers in a circumferential direction.

In this valve timing adjustment device, the internal teeth are formed at an inner peripheral surface of the driving-side rotatable body, and a sprocket portion, which receives the drive force transmitted from a drive shaft, is formed at an outer peripheral surface of the driving-side rotatable body. Here, the sprocket portion may be formed such that a shape and a size of the sprocket portion and the number of teeth of the sprocket portion vary according to a specification of the internal combustion engine. In such a case, in the valve timing adjustment device, the design of the driving-side rotatable body, which has the internal teeth required to have the accuracy, may need to be changed according to the specification of the internal combustion engine, and thereby costs required for manufacturing of the driving-side rotatable body may possibly be increased. Furthermore, since the design of the driving-side rotatable body, which has the internal teeth, may need to be changed according to the specification of the internal combustion engine, an assembling step of the valve timing adjustment device may possibly become complicated. Therefore, it is desirable to have a technology that can limit the increase in the costs for manufacturing of the valve timing adjustment device.

The present disclosure may be implemented as follows. According to one aspect of the present disclosure, there is provided a valve timing adjustment device to be installed to an end part of a driven shaft in an axial direction while the driven shaft is configured to receive a drive force transmitted from a drive shaft at an internal combustion engine. The valve timing adjustment device is configured to adjust a valve timing of a valve that is driven to open and close by the driven shaft. The valve timing adjustment device includes a driving-side rotatable body, an eccentric shaft portion, a plurality of rollers, a driven-side rotatable body and a cover portion. The driving-side rotatable body is configured to be rotated about a rotational axis synchronously with the drive shaft and includes a sprocket portion and a housing portion. The sprocket portion is configured to receive the drive force transmitted from the drive shaft. The housing portion is shaped in a tubular form and is formed separately from the sprocket portion. The housing portion has a plurality of internal teeth formed at an inner peripheral surface of the housing portion. The eccentric shaft portion is shaped in a cylindrical tubular form and is configured to be rotated by an actuator. An outer peripheral surface of the eccentric shaft portion is formed to be eccentric to the rotational axis. The plurality of rollers are placed between the plurality of internal teeth and the eccentric shaft portion in a radial direction perpendicular to the axial direction and are arranged one after another in a circumferential direction. A number of the plurality of rollers is smaller than a number of the plurality of internal teeth. The driven-side rotatable body is configured to be rotated about the rotational axis synchronously with the driven shaft and includes a retainer and a stopper portion. The retainer is configured to limit movement of the plurality of rollers in the circumferential direction. The stopper portion is configured to define a limit of a relative rotational phase of the driven shaft relative to the drive shaft. The cover portion is placed on an outer side of the stopper portion in the radial direction. The cover portion has an engaging portion which is configured to be engaged with the stopper portion in the circumferential direction. The housing portion has a press-fitting portion that is press-fitted to an inner peripheral surface of the sprocket portion.

In the valve timing adjustment device of the above aspect, since the sprocket portion and the housing portion are formed separately, the housing portion can be provided as a common component regardless of the specification of the internal combustion engine by separately forming the sprocket portion, which would be designed according to the specification of the internal combustion engine, and the housing portion, at which the internal teeth are required to have the accuracy as a speed reducing mechanism. Therefore, it is possible to limit an increase in the costs required for manufacturing of the driving-side rotatable body. Furthermore, since the housing portion has the press-fitting portion, which is press-fitted to the inner peripheral surface of the sprocket portion, the sprocket portion and the housing portion can be fixed together by press-fitting the press-fitting portion to the inner peripheral surface of the sprocket portion after assembling the eccentric shaft portion, the rollers and the driven-side rotatable body to the housing portion. Therefore, the steps, which take place before the step of assembling the sprocket portion, can be commonized regardless of the specification of the internal combustion engine. Thus, it is possible to limit complication of the assembling step of the valve timing adjustment device. As a result, it is possible to limit an increase in the costs required for the manufacturing of the valve timing adjustment device.

The present disclosure may be implemented in various forms. For example, the present disclosure may be implemented as a manufacturing method of such a valve timing adjustment device, an internal combustion engine having such a valve timing adjustment device and a vehicle having such an internal combustion engine.

Hereinafter, embodiments of the present disclosure will be described with reference to the drawings.

A. First Embodiment

A-1. Device Structure:

A valve timing adjustment device 100 of a first embodiment shown in FIG. 1 is installed at a drive force transmission path which extends from a crankshaft 210 to a camshaft 220 of an internal combustion engine on a vehicle (not shown). The valve timing adjustment device 100 is configured to adjust a valve timing of valves (not shown) that is driven to open and close by the camshaft 220 which receives an engine torque transmitted from the crankshaft 210. The valve timing adjustment device 100 of the present embodiment is fixed to an end part of the camshaft 220 in a direction (hereinafter referred to as an axial direction AD) along a rotational axis AX1 of the camshaft 220 and is configured to adjust a valve timing of intake valves among the intake valves and exhaust valves. In the following description, a side of the valve timing adjustment device 100, at which the camshaft 220 is placed in the axial direction AD, will be also referred to as a rear side, and an opposite side of the valve timing adjustment device 100, which is opposite to the rear side in the axial direction AD, will be also referred to as a front side.

The valve timing adjustment device 100 is driven by an electric actuator (not shown) which is connected to the front side of the valve timing adjustment device 100. The electric actuator is controlled by an ECU (not shown) which controls an entire operation of the internal combustion engine 200.

Figure 2:
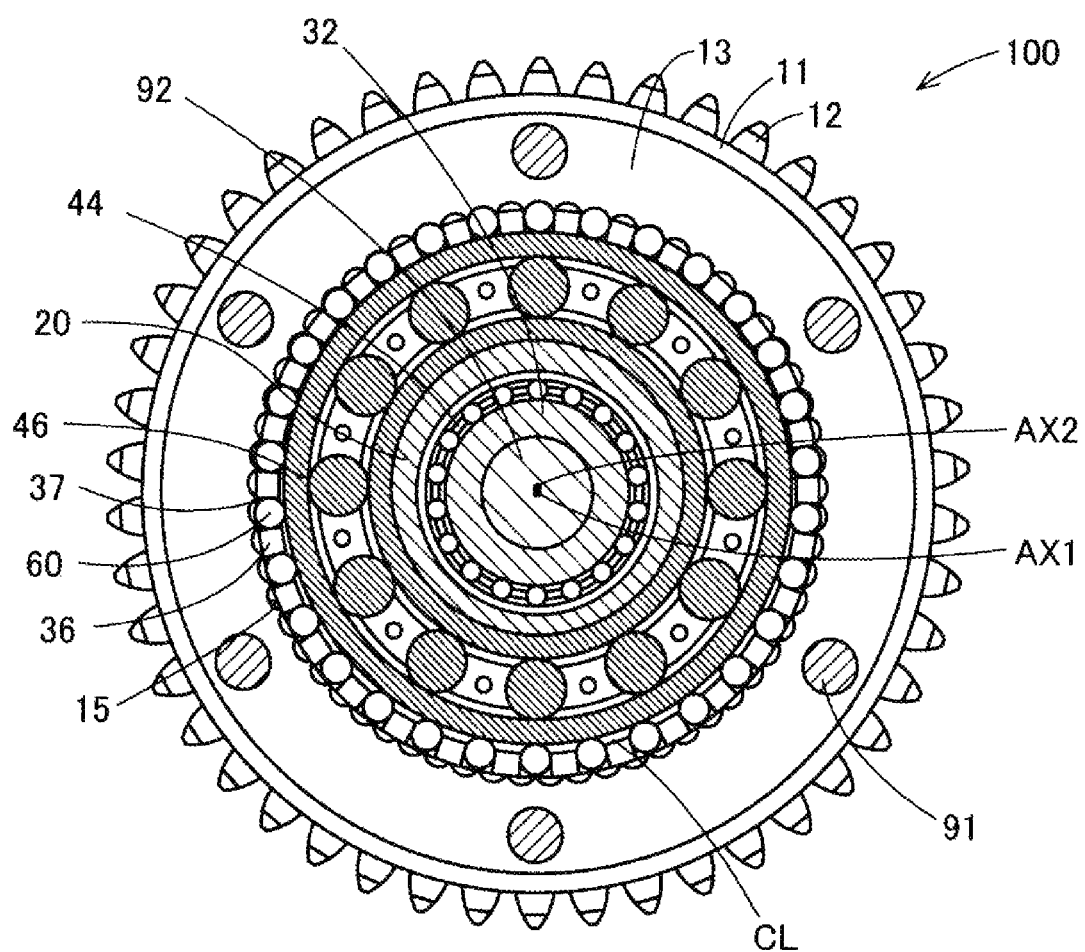
FIG. 2 is a cross-sectional view taken along line II-II in FIG. 1.
Figure 3:
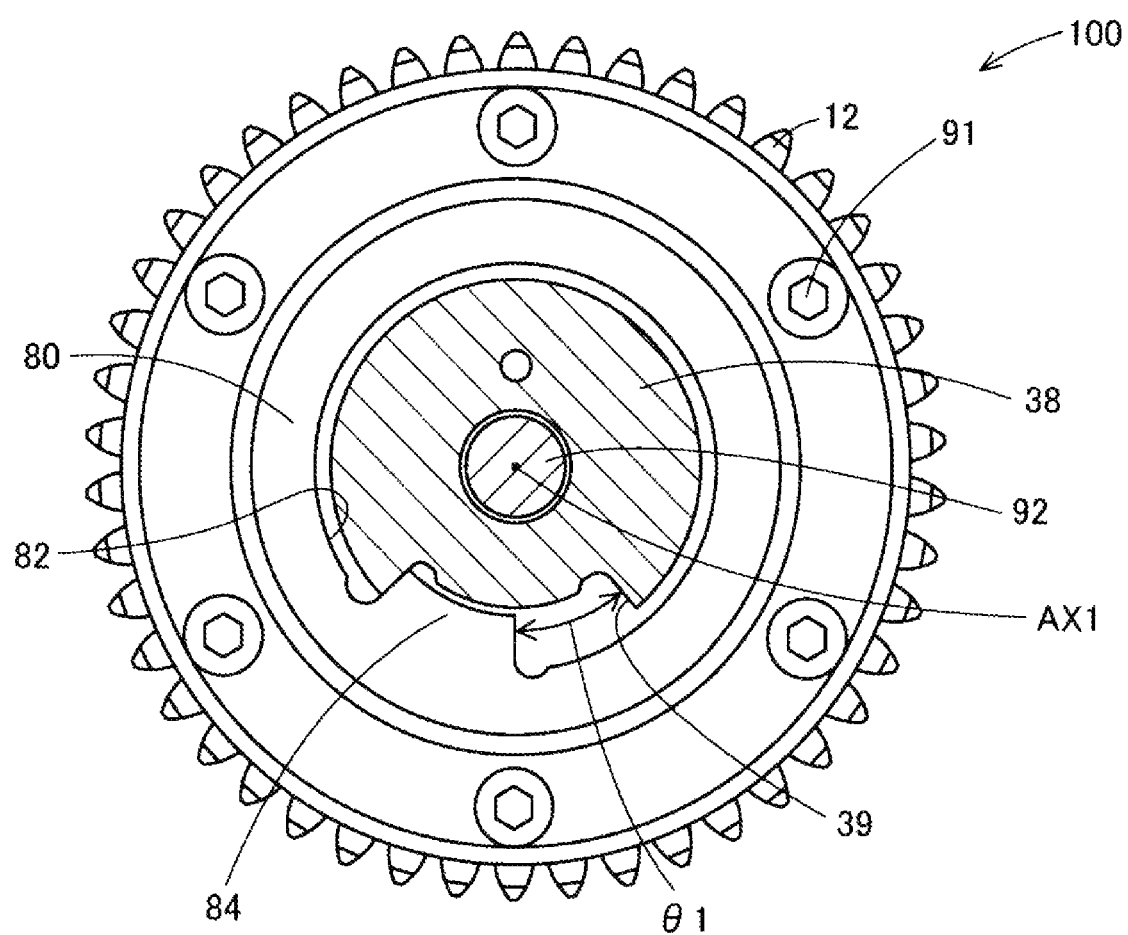
FIG. 3 is a cross-sectional view taken along line III-Ill in FIG. 1.

As shown in FIGS. 1 to 3, the valve timing adjustment device 100 includes a driving-side rotatable body 10, an eccentric shaft portion 20, a driven-side rotatable body 30, a plurality of rollers 60, a cover portion 80, a small-diameter bearing 42, a needle roller bearing 44, a large-diameter bearing 46 and an intermediate-diameter bearing 48.

The driving-side rotatable body 10 is rotated about the rotational axis AX1 of the camshaft 220 synchronously with the crankshaft 210. As shown in FIG. 1, the driving-side rotatable body 10 includes a sprocket portion 11, a housing portion 13 and a front cover 18 which are arranged in this order from the rear side. The sprocket portion 11, the housing portion 13 and the front cover 18 are fastened together by a plurality of bolts 91.

The sprocket portion 11 is shaped generally in a ring form and has a gear portion 12 arranged at an outer peripheral surface of the sprocket portion 11. A timing chain 215 is wound around the gear portion 12 and a gear 212 of the crankshaft 210. When a drive force of the crankshaft 210 is transmitted to the sprocket portion 11 through the timing chain 215, the driving-side rotatable body 10 is rotated synchronously with the crankshaft 210. A timing belt or the like may be used in place of the timing chain 215. A shape and a size of the sprocket portion 11 and the number of teeth of the gear portion 12 of the sprocket portion 11 would be designed based on a specification of the internal combustion engine 200.

The housing portion 13 is shaped generally in a tubular form. The housing portion 13 includes a ring portion 14 and a press-fitting portion 16. A plurality of internal teeth 15 is arranged along an inner peripheral surface of the ring portion 14. The press-fitting portion 16 projects from the ring portion 14 toward the rear side. The press-fitting portion 16 is shaped generally in a cylindrical tubular form and extends in the axial direction AD. The press-fitting portion 16 is press-fitted to an inner peripheral surface of the sprocket portion 11.

The front cover 18 is shaped in a circular plate form. An opening 19 is formed generally at the center of the front cover 18. The eccentric shaft portion 20 is inserted through the opening 19.

The eccentric shaft portion 20 is shaped generally in a cylindrical tubular form and is coupled to an output shaft (not shown) of the electric actuator such that the eccentric shaft portion 20 is rotated by the output shaft about the rotational axis AX1. An outer peripheral surface of a rear side section of the eccentric shaft portion 20 is formed to be eccentric to the rotational axis AX1. An axis of this outer peripheral surface is also referred to as an eccentric axis AX2.

The driven-side rotatable body 30 is rotated about the rotational axis AX1 synchronously with the camshaft 220. The driven-side rotatable body 30 is fixed to the end part of the camshaft 220 in the axial direction AD by a center bolt 92 and can be rotated relative to the driving-side rotatable body 10. The driven-side rotatable body 30 includes a main body 31 and a plate portion 38.

The main body 31 includes a tubular portion 32, a disk portion 34, a bearing portion 35 and a retainer 36. The tubular portion 32 is shaped generally in a cylindrical tubular form and is located on a radially inner side of the eccentric shaft portion 20. The small-diameter bearing 42 and the needle roller bearing 44 are arranged in this order from the front side and are installed between an outer peripheral surface of the tubular portion 32 and an inner peripheral surface of the eccentric shaft portion 20. The eccentric shaft portion 20 is supported rotatably relative to the tubular portion 32 by the small-diameter bearing 42 and the needle roller bearing 44. The tubular portion 32 has an axial hole 33 that extends along the rotational axis AX1. The center bolt 92 is inserted into the axial hole 33. The disk portion 34 is shaped generally in a circular plate form. The disk portion 34 is joined to an end part of the tubular portion 32 located on the rear side and extends radially outwardly. The bearing portion 35 is shaped in a ring form and projects from the disk portion 34 toward the rear side. The large-diameter bearing 46 is installed between an outer peripheral surface of the bearing portion 35 and an inner peripheral surface of the press-fitting portion 16 of the housing portion 13.

The retainer 36 is shaped generally in a cylindrical tubular form. The retainer 36 is joined to a radially outer periphery of the disk portion 34 and extends toward the front side. The retainer 36 is inserted between an inner peripheral surface of the housing portion 13 of the driving-side rotatable body 10 and an outer peripheral surface of the intermediate-diameter bearing 48. The intermediate-diameter bearing 48 is installed to the outer peripheral surface of the eccentric shaft portion 20 which is coaxial with the eccentric axis AX2. A plurality of roller retaining holes 37 is formed at the retainer 36 such that the roller retaining holes 37 are arranged at equal intervals in the circumferential direction. Each of the roller retaining holes 37 is shaped generally in a rectangular form in a view taken in the radial direction. The roller retaining holes 37 rotatably retain the rollers 60. In the present embodiment, the number of the roller retaining holes 37 is smaller than the number of the internal teeth 15 formed at the housing portion 13 of the driving-side rotatable body 10. The retainer 36 has a function of limiting movement of the rollers 60 in the circumferential direction and a function of outputting the rotational force to the camshaft 220.

The plate portion 38 is shaped generally in a circular plate form and is arranged such that the plate portion 38 contacts an end surface of the disk portion 34 located on the rear side. In the present embodiment, the plate portion 38 is formed separately from the main body 31 and is fastened to the main body 31 by the center bolt 92. Alternatively, the plate portion 38 may be formed integrally with the main body 31 in one-piece. As shown in FIG. 3, a stopper portion 39 is formed at a radially outer periphery of the plate portion 38. The stopper portion 39 is radially inwardly recessed and is partially formed in the circumferential direction along the radially outer periphery of the plate portion 38. The stopper portion 39 is configured to define a limit of a relative rotational phase of the camshaft 220 relative to the crankshaft 210 as will be described later.

As shown in FIG. 2, the rollers 60 are placed between the inner peripheral surface of the housing portion 13 of the driving-side rotatable body 10 and the outer peripheral surface of the intermediate-diameter bearing 48 and are arranged at equal intervals in the circumferential direction. As described above, the rollers 60 are placed between the internal teeth 15 and the eccentric shaft portion 20 in the radial direction and are arranged in the circumferential direction. In the present embodiment, the number of the rollers 60 is smaller than the number of internal teeth 15 formed at the housing portion 13 of the driving-side rotatable body 10 and is equal to the number of the roller retaining holes 37. Each of the rollers 60 is placed in a corresponding one of the roller retaining holes 37 of the retainer 36 of the driven-side rotatable body 30 and is retained by the retainer 36 in a state where movement of the roller 60 in the radial direction is permitted. Each of the rollers 60 always contacts the outer peripheral surface of the intermediate-diameter bearing 48. A gap CL, which arcuately extends and is shaped in a crescent form, is partially formed in the circumferential direction on the radially outer side of the intermediate-diameter bearing 48. The intermediate-diameter bearing 48 is movable in the radial direction through this gap CL in response to eccentric rotation of the eccentric shaft portion 20, i.e., the intermediate-diameter bearing 48 is eccentrically movable. Each of the rollers 60 is guided by the retainer 36 and oscillates in the radial direction in response to the eccentric movement of the intermediate-diameter bearing 48, so that corresponding ones of the rollers 60 are fitted into corresponding ones of the internal teeth 15 formed at the housing portion 13.

The cover portion 80 shown in FIGS. 1 and 3 is shaped generally in a circular plate form and is arranged such that the cover portion 80 contacts an end surface of the sprocket portion 11 located on the rear side and an end surface of the large-diameter bearing 46 located on the rear side. The cover portion 80 is fastened to the driving-side rotatable body 10 by the bolts 91. An opening 82 is formed generally at a center of the cover portion 80. The plate portion 38 of the driven-side rotatable body 30 is placed in the opening 82. Therefore, the cover portion 80 is located on the radially outer side of the stopper portion 39. An engaging portion 84, which radially inwardly projects, is partially formed in the circumferential direction at the opening 82. As discussed above, the engaging portion 84 extends in the circumferential direction over a predetermined extension angle about the rotational axis AX1. The engaging portion 84 is engageable in the circumferential direction with the stopper portion 39 that is configured to define the limit of the relative rotational phase of the camshaft 220 relative to the crankshaft 210. Therefore, a phase change angle 81 is defined by the engaging portion 84 and the stopper portion 39. As described above, the cover portion 80 has a function of urging the large-diameter bearing 46 in the axial direction AD and a function of defining the phase change angle 81.

In the valve timing adjustment device 100 having the above-described structure, when the eccentric shaft portion 20 is rotated by the electric actuator, each roller 60 rotates and moves in the circumferential direction from one of the internal teeth 15 formed at the housing portion 13 to another adjacent one of the internal teeth 15 while each roller 60 is guided by the retainer 36. The rotation of the eccentric shaft portion 20 is transmitted to the driven-side rotatable body 30 in a state where a rotational speed of the eccentric shaft portion 20 is reduced by the movement of each roller 60, and thereby the relative rotational phase of the driven-side rotatable body 30 relative to the driving-side rotatable body 10 is changed. Therefore, the phase of the camshaft 220 relative to the crankshaft 210 is changed, and there is achieved the valve timing that corresponds to this phase.

In the present embodiment, the crankshaft 210 corresponds to a subordinate concept of a drive shaft of the present disclosure, and the camshaft 220 corresponds to a subordinate concept of a driven shaft of the present disclosure.

Figure 4:
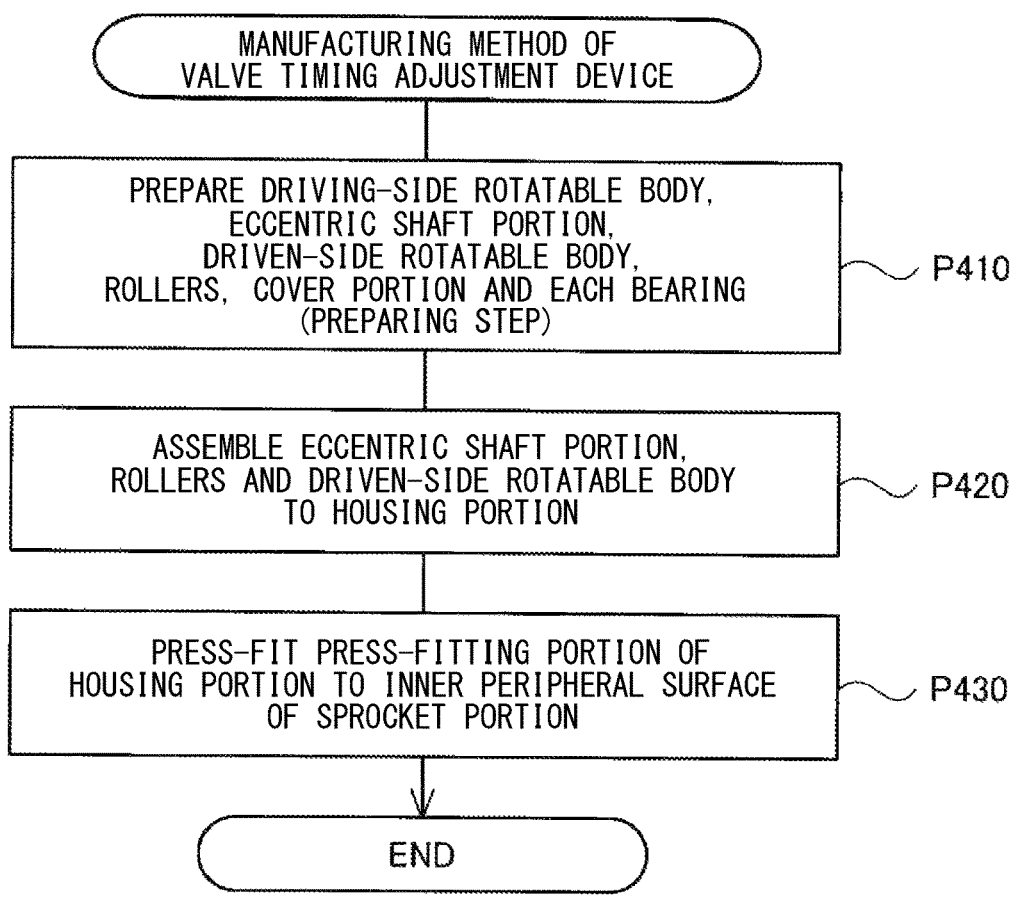
FIG. 4 is a flowchart indicating a procedure of a manufacturing method of the valve timing adjustment device.

A-2. Manufacturing Method of Valve Timing Adjustment Device:

In a manufacturing method of the valve timing adjustment device 100 indicated in FIG. 4, the driving-side rotatable body 10, the eccentric shaft portion 20, the driven-side rotatable body 30, the rollers 60, the cover portion 80 and the respective bearings 42, 44, 46, 48, which are configured in the above-described manner, are prepared (step P410). The step P410 is also referred to as a preparing step. In the preparing step, the driving-side rotatable body 10 is prepared such that the sprocket portion 11 and the housing portion 13 are formed separately.

The eccentric shaft portion 20, the rollers 60 and the driven-side rotatable body 30 are assembled to the housing portion 13 (step P420). At the step P420, the large-diameter bearing 46 is placed between the inner peripheral surface of the press-fitting portion 16 of the housing portion 13 and the outer peripheral surface of the bearing portion 35 of the driven-side rotatable body 30. The large-diameter bearing 46 is held by the press-fitting portion 16.

The press-fitting portion 16 of the housing portion 13 is press-fitted to the inner peripheral surface of the sprocket portion 11 to fix the sprocket portion 11 and the housing portion 13 together (step P430). After completion of the step P430, the cover portion 80 is fastened to the driving-side rotatable body 10 by the bolts 91, and the manufacturing of the valve timing adjustment device 100 is completed.

In the valve timing adjustment device 100 of the first embodiment described above, the sprocket portion 11 and the housing portion 13 are formed separately, i.e., are formed as separate pieces. Although the shape and the size of the sprocket portion 11 and the number of teeth of the gear portion 12 of the sprocket portion 11 would be designed based on the specification of the internal combustion engine 200, this sprocket portion 11 is formed separately from the housing portion 13, at which the internal teeth 15 are required to have the accuracy as the speed reducing mechanism. Thus, the housing portion 13 can be formed as a common component regardless of the specification of the internal combustion engine 200. Therefore, it is possible to limit an increase in the costs required for the manufacturing of the driving-side rotatable body 10.

In a structure, in which the sprocket portion 11 and the housing portion 13 are formed integrally in one-piece, the design of the driving-side rotatable body 10, which has the internal teeth 15 required to have the accuracy, needs to be changed according to the specification of the internal combustion engine 200. Thus, the costs required for the manufacturing of the driving-side rotatable body 10 are disadvantageously increased.

In contrast, according to the valve timing adjustment device 100 of the present embodiment, since the sprocket portion 11 and the housing portion 13 are formed separately, it is possible to limit the increase in the costs required for the manufacturing of the driving-side rotatable body 10, and it is possible to limit deterioration of the design freedom of the timing chain 215 and/or the gear portion 12.

Since the housing portion 13 has the press-fitting portion 16, which is press-fitted to the inner peripheral surface of the sprocket portion 11, the sprocket portion 11 and the housing portion 13 can be fixed together by press-fitting the press-fitting portion 16 to the inner peripheral surface of the sprocket portion 11 after assembling the eccentric shaft portion 20, the rollers 60 and the driven-side rotatable body 30 to the housing portion 13. Therefore, the steps, which take place before the step of assembling the sprocket portion 11, can be commonized regardless of the specification of the internal combustion engine 200. Thus, it is possible to limit complication of the assembling step of the valve timing adjustment device 100.

As a result, it is possible to limit an increase in the costs required for the manufacturing of the valve timing adjustment device 100.

B. Second Embodiment

Figure 5:
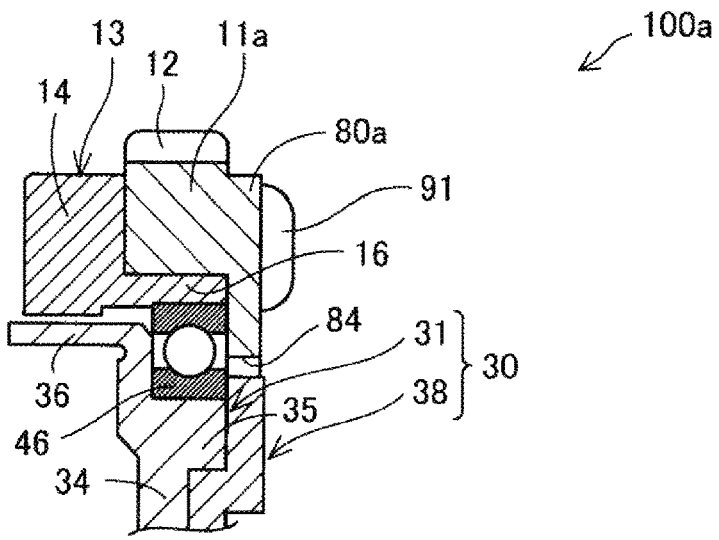
FIG. 5 is a schematic cross-sectional view schematically indicating a main structure according to a second embodiment.
Figure 6:
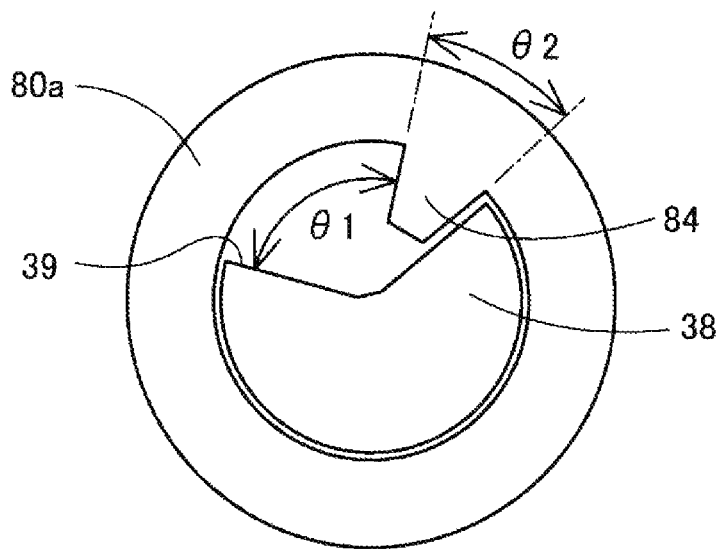
FIG. 6 is a descriptive diagram indicating an extension angle of an engaging portion in a circumferential direction.
Figure 7:
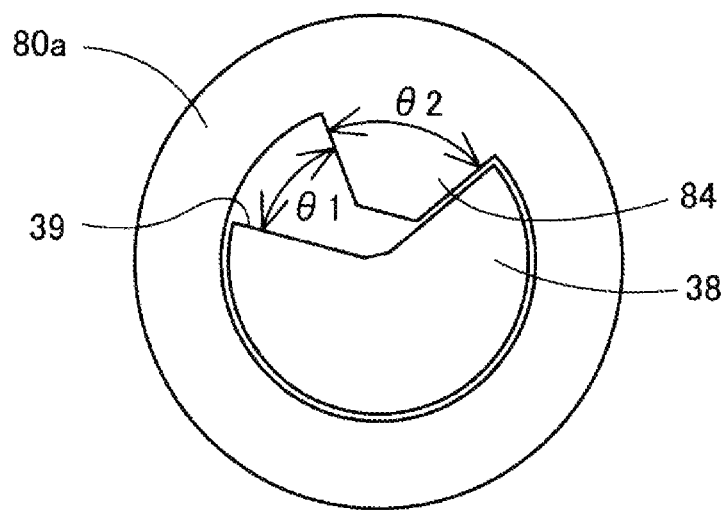
FIG. 7 is a descriptive diagram indicating an extension angle of an engaging portion in a circumferential direction.

A valve timing adjustment device 100a of a second embodiment shown in FIGS. 5 to 7 differs from the valve timing adjustment device 100 of the first embodiment with respect to that the sprocket portion 11a and the cover portion 80a, which are formed separately in the first embodiment, are formed integrally in one-piece in the second embodiment. The rest of the structure is the same as that of the first embodiment, so that the identical portions, which are identical to those of the first embodiment, will be indicated by the same reference signs, and the detailed description thereof will be omitted. In FIG. 5, as a main feature of the valve timing adjustment device 100a, the housing portion 13, the sprocket portion 11a, the cover portion 80a, the large-diameter bearing 46 and the driven-side rotatable body 30 are partially enlarged in the cross-section that is similar to that of FIG. 1. Furthermore, FIGS. 6 and 7 schematically show the cross section that is similar to the cross-section shown in FIG. 3.

The cover portion 80a of the second embodiment is formed as a single member that has both the function of the sprocket portion 11a and the function of the engaging portion 84. As shown in FIGS. 6 and 7, according to the present embodiment, in the cover portion 80a, an extension angle 82 of the engaging portion 84 in the circumferential direction is set according to the specification of the internal combustion engine 200. Therefore, the phase change angle 81, which corresponds to the specification of the internal combustion engine 200, is defined. The setting of the extension angle 82 according to the specification of the internal combustion engine 200 may be written in the specification of the valve timing adjustment device 100a or the instruction manual of the valve timing adjustment device 100a.

The valve timing adjustment device 100a of the second embodiment described above achieve advantages which are similar to those of the valve timing adjustment device 100 of the first embodiment. In addition, since the sprocket portion 11a is formed integrally with the cover portion 80a in one-piece, the number of the components can be reduced, and the assembling step can be simplified. Furthermore, since the extension angle 82 of the engaging portion 84 in the circumferential direction is set according to the specification of the internal combustion engine 200, an angle of the stopper portion 39 in the circumferential direction can be identically set among different models regardless of the specification of the internal combustion engine 200. Thus, the plate portion 38 can be provided as a common component regardless of the specification of the internal combustion engine 200. As a result, since the sprocket portion 11a, which would be formed according to the specification of the internal combustion engine 200, and the engaging portion 84 are both formed in the cover portion 80a, the other components, which are other than the cover portion 80a, can be provided as common components. Thus, it is possible to further limit the increase in the costs required for the manufacturing of the valve timing adjustment device 100a.

C. Other Embodiments (1) In the second embodiment described above, the engaging portion 84 is formed in the circumferential direction over the extension angle 82 that corresponds to the specification of the internal combustion engine 200. Alternatively, the engaging portion 84 may be identically formed regardless of the specification of the internal combustion engine 200. In this case, the phase change angle 81 may be defined by setting the angle of the stopper portion 39 in the circumferential direction according to the specification of the internal combustion engine 200. Even with this construction, the advantages, which are similar to those of the second embodiment, can be achieved.

(2) The structure of the valve timing adjustment device 100, 100a in each of the above embodiments is only an example and may be modified in various ways. For example, in each of the above embodiments, the stopper portion 39 is radially inwardly recessed, and the engaging portion 84 radially inwardly projects. Alternatively, the stopper portion 39 may radially outwardly project, and the engaging portion 84 may be radially outwardly recessed. Furthermore, the corresponding components may be fixed together by, for example, welding instead of using the bolts 91 and the center bolt 92 for the fastening. Even with this configuration, the advantages, which are similar to those of each of the above embodiments, can be achieved.

(3) The valve timing adjustment device 100, 100a of each of the above embodiments is configured to adjust the valve timing of the intake valves which are driven to open and close by the camshaft 220. Alternatively, the valve timing adjustment device 100, 100a may be configured to adjust a valve timing of the exhaust valves. Furthermore, the valve timing adjustment device 100, 100a may be used to be installed to the end part of the camshaft 220 (serving as the driven shaft), to which the drive force is transmitted from the crankshaft 210 (serving as the drive shaft) through an intermediate shaft. Furthermore, the valve timing adjustment device 100, 100a may be used to be installed to an end part of one of a drive shaft and a driven shaft of a dual structure camshaft.

The present disclosure should not be limited to the above-described embodiments and can be realized in various configurations without departing from the principle of the present disclosure. For example, the technical features of each embodiment, which corresponds to the technical features in the summary section of the present disclosure, may be replaced or combined as appropriate to address some or all of the disadvantages described above or to achieve some or all of the advantages described above. If the technical feature is not described as essential in the specification, it can be deleted as appropriate.

What is claimed is:

1. A valve timing adjustment device to be mounted to an axial end part of a driven shaft configure to receive a drive force transmitted from a drive shaft of an internal combustion engine, wherein the valve timing adjustment device is configured to adjust a valve timing of a valve that is driven to open and close by the driven shaft, the valve timing adjustment device comprising:
   a driving-side rotatable body configured to rotate about a rotational axis synchronously with the drive shaft, the driving-side rotatable body including:
      a sprocket portion configured to receive the drive force transmitted from the drive shaft; and
      a housing portion shaped in a tubular form and is formed separately from the sprocket portion, the housing portion including a plurality of internal teeth formed at an inner peripheral surface of the housing portion;
   an eccentric shaft portion shaped in a cylindrical tubular form with an outer peripheral surface formed to be eccentric to the rotational axis, the eccentric shaft portion configured to be rotated by an actuator;
   a plurality of rollers arranged in a circumferential array between the plurality of internal teeth and the outer peripheral surface of the eccentric shaft portion the plurality of rollers including a quantity of rollers that is less than a quantity of internal teeth of the plurality of internal teeth;
   a driven-side rotatable body configured to rotate about the rotational axis synchronously with the driven shaft, the driven-side rotatable body including:
      a retainer configured to limit circumferential movement of the plurality of rollers; and
      a stopper portion configured to define a limit of a rotational phase of the driven shaft relative to the drive shaft; and
   a cover portion arranged on a radially outer side of the stopper portion the cover portion including an engaging portion configured to circumferentially engage the stopper portion, wherein:
   the housing portion further includes a press-fitting portion shaped in a cylindrical tubular form and is press-fitted to an inner peripheral surface of a through-hole of the sprocket portion; and
   a bearing is arranged between an inner peripheral surface of the press-fitting portion and an outer peripheral surface of the driven-side rotatable body so as to enable relative rotation between the housing portion and the driven-side rotatable body.

2. The valve timing adjustment device according to claim 1, wherein the sprocket portion is formed integrally with the cover portion in one-piece.

3. The valve timing adjustment device according to claim 2, wherein the engaging portion extends circumferentially over an extension angle corresponding to a specification of the internal combustion engine.

4. A method for manufacturing the valve timing adjustment device of claim 1, the method comprising:
   forming the sprocket portion and the housing portion separately;

assembling the eccentric shaft portion, the plurality of rollers and the driven-side rotatable body to the housing portion;

press-fitting the press-fitting portion to the inner peripheral surface of the through-hole of the sprocket portion so as to fix the sprocket portion to the housing portion; and installing the bearing between the inner peripheral surface of the press-fitting portion and the outer peripheral surface of the driven-side rotatable body so as to enable relative rotation between the housing portion and the driven-side rotatable body.

\* \* \* \* \*